Figure 1:
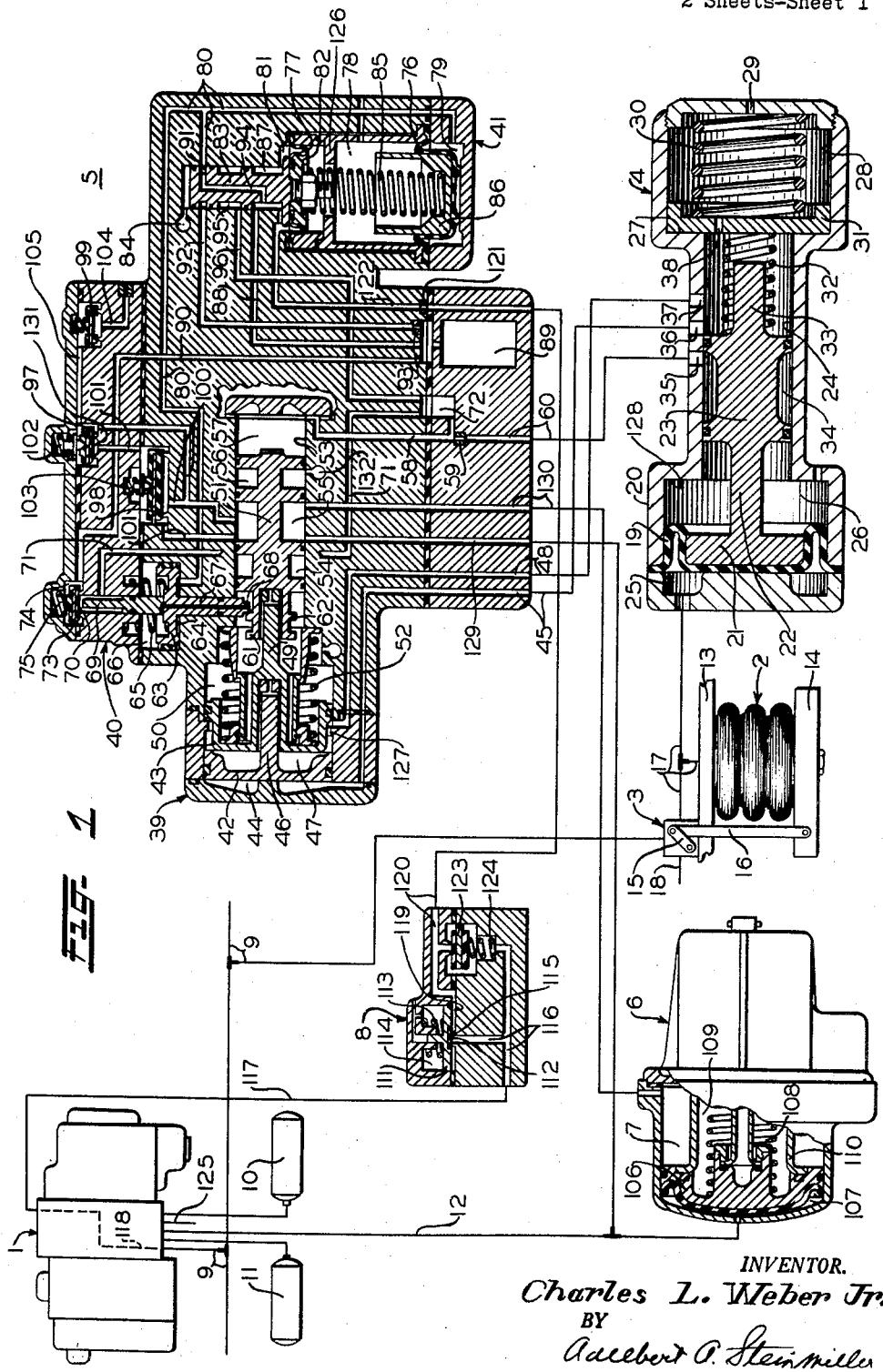

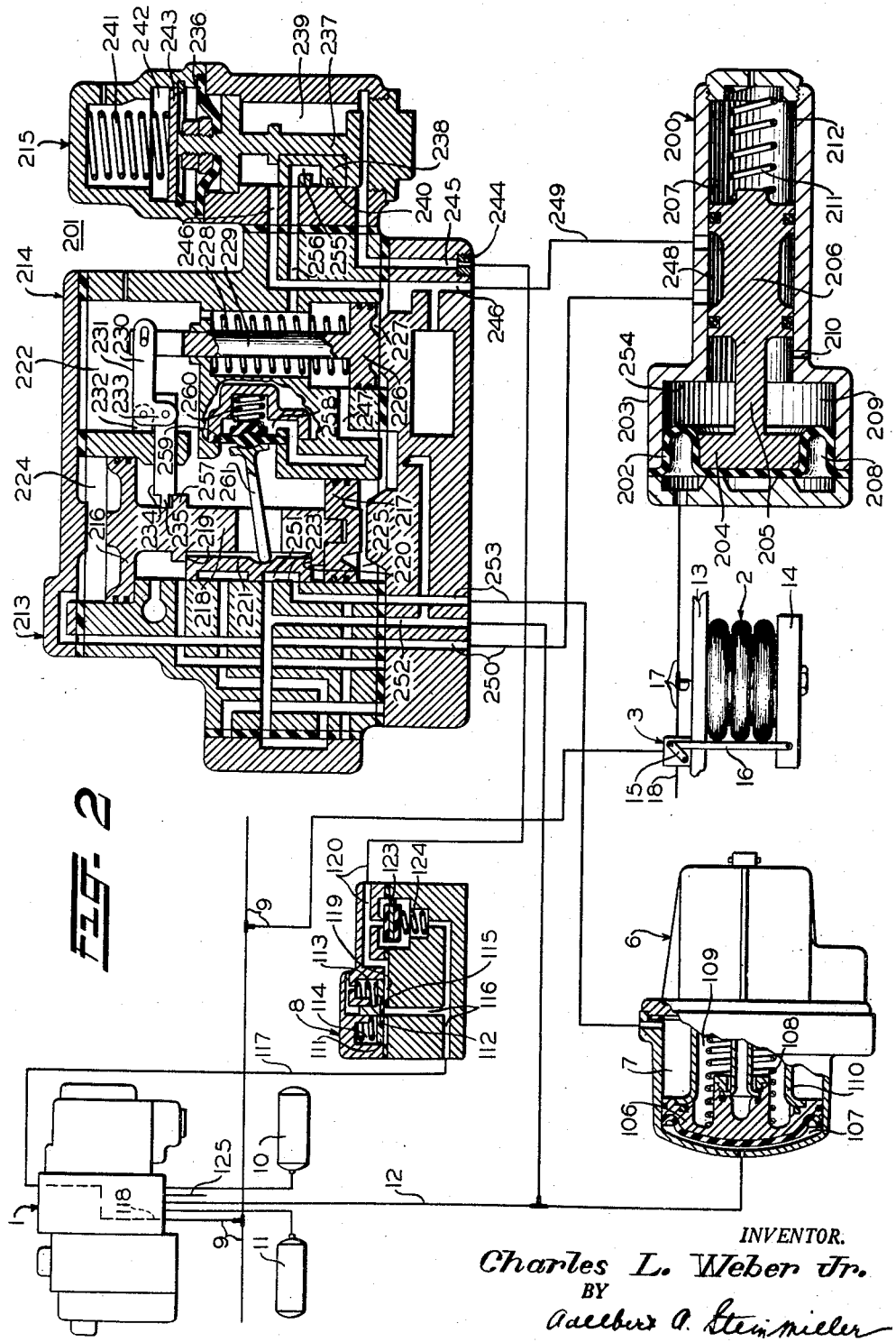

United States Patent Office 2,919,164
Patented Dec. 29, 1959

2,919,164

LOAD-CONTROLLED FLUID PRESSURE BRAKE APPARATUS

Charles L. Weber, Jr., Pittsburgh, Pa., assignor to Westinghouse Air Brake Company, Wilmerding, Pa., a corporation of Pennsylvania Application June 27, 1957, Serial No. 668,521

9 Claims. (Cl. 303—22)

This invention relates to load-controlled fluid pressure brake apparatus and more particularly to such apparatus for use on railway cars or the like of the type in which the car body is resiliently supported upon an unsprung member by fluid pressure in an air spring, the pressure of fluid in which is varied from time to time as may be necessary to maintain the car body at a preselected constant height relative to the unsprung member.

The principal object of this invention is to provide an improved apparatus of the above type embodying a conditioning valve which is controlled by air spring pressure for conditioning a load-adjusted valve of a selector valve device to cause the latter to control the pressure of fluid in the compensating chamber of a load-compensating type brake cylinder, to thereby provide different braking ratios according to car load as denoted by the pressure of fluid in the air spring.

Another object is to provide a brake apparatus of the type described in the precedure object embodying means for rendering the conditioning valve ineffective and locking the load-adjusted valve in a load-adjusted position except during the initial phase of initial charging of the brake pipe and during the initial phase of recharging of the brake pipe following an emergency application of brakes.

Another object is to provide an improved brake apparatus of the above type embodying retarding valve means operative during initial charging of the apparatus to defer operation of the selector valve device until after the air spring has been charged to a value sufficient to maintain the car body at the aforementioned preselected height above the rails, so that the conditioning valve will be in a position truly reflecting the load on the car prior to operation of said load-adjusted valve.

According to these objects, two embodiments of the improved brake apparatus are provided. According to the first embodiment, a three-position conditioning valve is operative to cause a three-position load-adjusted valve to assume a light load, a partial load or a full load position according to whether air spring pressure is below a chosen value, between said chosen value and a chosen higher value, or above said chosen higher value, for thereby conditioning the load-adjusted valve to operate to provide in the compensating chamber of a load-compensating type brake cylinder fluid at the pressure of fluid in the main chamber of said brake cylinder, or at a pressure which is a chosen degree less than main chamber pressure, or at atmospheric pressure, respectively. According to the second embodiment, a two-position conditioning valve is operative to cause a two-position load-adjusted valve to assume a light load or a full load position according to whether air spring pressure is below or above a chosen value, for thereby conditioning the load-adjusted valve to connect the compensating chamber selectively to the main chamber or to atmosphere, respectively. According to both embodiments, the selector valve device preferably comprises, in addition to the load-adjusted valve, a pneumatically controlled locking means for normally locking the load-adjusted valve in position, and a cutoff valve which is normally in a cut-off position but is operative during initial charging and during recharging of the brake pipe following an emergency application of brakes to a cut-in position for causing the locking means to be disengaged from said load-adjusted valve and causing said load-adjusted valve to be positioned according to positioning of said conditioning valve.

Other objects and advantages will become apparent from the following more detailed description of the invention and from the accompanying drawings wherein:

Fig. 1 is a diagrammatic view of a load-controlled fluid pressure brake apparatus constructed according to one embodiment of the invention; and Fig. 2 is a diagrammatic view of a load-controlled fluid pressure brake apparatus constructed according to another embodiment of the invention.

Description—Fig. 1

The brake apparatus constructed according to this embodiment of the invention comprises a brake controlling valve device 1; an air spring 2; a leveling valve device 3 for controlling pressure of fluid in the air spring 2; a conditioning valve device 4 controlled by air spring pressure; a selector valve device 5 conditioned by the conditioning valve device 4; and a load-compensating type brake cylinder device 6 having a compensating chamber 7, the pressure of fluid in which is controlled by said selector valve device 5. The apparatus also preferably comprises a retarding valve device 8 for deferring operation of the selector valve device 5 until after the air spring 2 is charged to a pressure sufficient to maintain the car body at a preselected height above the rails under the existing condition of car body load.

The brake controlling valve device 1 may be of any well-known type, such as the "AB" valve, comprising valve means (not shown) responsive to a service rate of reduction in pressure of fluid in a brake pipe 9 below a normal charge value to supply fluid under pressure from an auxiliary reservoir 10 to a pipe 12 for causing a service application of brakes; responsive to an emergency rate of reduction in brake pipe pressure to supply fluid under pressure from the auxiliary reservoir 10 and also from an emergency reservoir 11 to pipe 12 for causing an emergency application of brakes; and responsive to an increase in brake pipe pressure, following either a service or emergency application of brakes, to release fluid under pressure from pipe 12 for causing a release of brakes and also connect the brake pipe to the auxiliary reservoir and emergency reservoir for recharging said reservoirs to equality with brake pipe pressure.

The air spring 2 is interposed between a sprung member, such as the body 13, of a railway car, and an unsprung member, such as an axle housing 14, for resiliently supporting the car body 13 relative to the axle housing 14.

The leveling valve device 3 may, for purposes of illustration, be of the type disclosed in the copending application of Harry C. May and Joseph F. Frola, U.S. Serial No. 568,113, filed February 27, 1956, and assigned to the assignee of the present invention. This leveling valve device is mounted on the car body 13 or other sprung member and comprises, briefly, valve means (not shown) controlled by a suitable lever 15 pivotally connected at one end to a rotatable cam shaft (not shown) and at the opposite end to one end of a link 16 that, at its opposite end, is anchored to an unsprung member, such as axle housing 14; said valve means being operable said link 16, lever 15 and cam shaft to supply fluid under pressure from a branch of the brake pipe 9 to the air spring 2 via a pipe 17 and release fluid under pressure from said air spring 2 via pipe 17 and a vent pipe 18, so as to establish in the air spring 2 different fluid pressures at different times as may be necessary to maintain the car body 13 at a constant preselected height relative to the axle housing 14. Thus, pressure of air established in the air spring 2 is an accurate measure of the load imposed by the car body 13 on the axle housing 14.

The conditioning valve device 4 preferably comprises a resilient diaphragm 19 that is suitably clamped about its outer edge between sections of a casing 20 and is operatively connected through the medium of a diaphragm follower 21 and a follower stem 22 to a coaxially arranged spool valve 23 having slidable sealing contact with the wall of an aligned bore 24 in casing 20. At the side of diaphragm 19 farthest from the spool valve 23 is a chamber 25 that is constantly connected to the air spring 2 via a branch of pipe 17; and at the opposite side of said diaphragm is an atmospheric chamber 26. Bore 24 is open at one end to chamber 26 and at the opposite end is joined by an outwardly directed radial shoulder 27 to a coaxially arranged larger bore 28 suitably enclosed at its outer end except for a vent port 29 via which said bore 28 is opened to the atmosphere.

A helical bias spring 30 disposed in bore 28 is suitably retained, to limit the extent of its expansion in the direction of the spool valve 23, by a disc-shaped spring retainer 31 that is normally urged by said spring into abutting contact with shoulder 27. Another helical bias spring 32, of lesser value than spring 30, bears against the retainer 31 and the adjacent end of spool valve 23 and encircles a pusher rod 33 which is of lesser diameter than, and is preferably formed integrally with, said spool valve and projects coaxially from said adjacent end of said spool valve toward said retainer.

When air spring pressure as noted in chamber 25 is less than a chosen value, thereby denoting a light degree of load imposed by the car body 13 on the axle housing 14, the spool valve 23 will be biased by spring 32 to a light load position, in which it is shown, and which position is defined by abutting contact of the diaphragm 19 with a suitable stop formed in the end wall of chamber 25. With the spool valve 23 in light load position, an elongated annular cavity 34 therein will be exposed solely to a casing port 35; casing ports 36 and 37 will both be exposed to the atmosphere past the end of spool valve 23 and via a vent port 38 in the spring retainer 31 and the vent port 29; and pusher rod 33 will be disengaged from said spring retainer, thereby permitting spring 30 to bias said spring retainer into contact with shoulder 27.

The selector valve device 5 may comprise a sectionalized casing containing a load-adjusted valve device 39 conditioned by the conditioning valve device 4, a locking device 40 for locking said valve device 39 in an adjusted position, and a cut-off valve device 41 for controlling operation of devices 39 and 40.

The load-adjusted valve device 39 comprises two coaxially arranged pistons 42 and 43 preferably of equal diameter slidably mounted in a casing. Piston 42 has at its outer side a chamber 44 open to a passage and pipe 45 leading to port 36 of device 4, and has at the opposite side a coaxially arranged stem 46 that extends through a chamber 47, which is at the inner side of piston 43 and is open to a passage and pipe 48 leading to port 37. Stem 46 projects into a central recess provided in the face of piston 43 exposed to pressure of fluid in chamber 47. Piston 43 has a coaxially arranged stem 49 that extends from the opposite face of said piston through an atmospheric chamber 50 into a central recess in a spool valve 51. Piston 43 is biased into abutting contact with stem 46 by a helical spring 52 that is disposed in chamber 50 and surrounds stem 49. Spool valve 51 is reciprocable within a bore 53, and has three spaced annular cavities 54, 55, 56 isolated from each other by O-ring seals; cavity 55 being intermediate the other cavities and cavity 54 being nearest piston 43. At the inner end of bore 53 is a chamber 57 which is open via a passage 58, a choke 59, and a passage and pipe 60 to port 35 of device 4. Preferably formed integrally with the end of spool valve 51 nearest chamber 50 is a reduced diameter portion having two spaced collars 61 and 62; collar 61 being nearer to piston 43.

The locking device 40 comprises a locking piston 63 subject to pressure of fluid in a chamber 64 opposing pressure of a helical bias spring 65 in an atmospheric chamber 66.

Preferably formed integrally with piston 63 is a coaxially arranged locking stem 67 which has sealing, slidably guided contact with the wall of a bore through a casing partition separating chamber 64 from the chamber 50. At its projecting end, which projects into chamber 50, stem 67 has a dog 68 which is positionable at the outer side of collar 61 or collar 62 or between said collars for locking the spool valve 51 against axial movement, in the manner hereinafter to be explained. Arranged coaxially with piston 63 is a pusher stem 69 having sealing, slidably guided contact with the wall of a bore open at one end to chamber 66 and at the opposite end to an annular chamber 70, which is defined by a reduced diameter portion of said pusher stem and is open via a passage 71 and a volume 72 to a branch of passage 58.

A disc-shaped poppet valve 73 arranged coaxially with, and adapted to be unseated by, pusher stem 69 is contained in a chamber 74 for controlling fluid pressure communication between chamber 74 and chamber 70. This poppet valve is normally held seated by a helical bias spring 75 in chamber 74.

The cut-off valve device 41 comprises two coaxially arranged diaphragms 76 and 77 of different effective areas that are separated by an atmospheric chamber 78. At the outer side of the larger diaphragm 76 is a chamber 79 which is open via a passage 80 to chamber 64 of device 40; and at the outer side of the smaller diaphragm 77 is a chamber 81. Diaphragm 77 is operatively connected, through the medium of a diaphragm follower assemblage 82 to a spool valve 83 that is slidably and sealingly reciprocable within a bore that at one end is open to chamber 81 and at the opposite end is open to atmosphere via a vent port 84.

A helical bias spring 85 in chamber 78 bears against the follower assemblage 82 of diaphragm 77 and against a dish-shaped diaphragm follower 86 for diaphragm 76 for biasing said diaphragms in opposite directions, such that when chambers 79 and 81 are vented, the spool valve 83 will assume a normal position, in which it is shown.

With spool valve 83 in normal position, an elongated annular cavity 87 therein connects chamber 81 to a passage 88 which is open to a volume 89 and also to a passage 90 leading to chamber 74 of device 40; an annular cavity 91 in said spool valve is in registry with a branch of passage 80 and also with a passage 92 that is open by way of a choke 93 to volume 89, this annular cavity 91 being constantly connected to cavity 87 by a suitable passageway 94 in said spool valve; and an elongated annular cavity 95, intermediate the cavities 87 and 91, is exposed solely to a passage 96 leading to volume 72.

The selector valve device 5 also comprises a limiting valve 97, a release valve 98, and a vacuum relief valve 99. Limiting valve 97, which is preferably in the form of a disc-shaped spring-biased check valve, is provided for preventing flow from a passage 100 to a passage 101 but permitting flow in the reverse direction. A helical spring 102 acts on the side of said limiting valve exposed to pressure of fluid in passage 100 for causing flow from passage 101 to passage 100 to be limited to a chosen degree, such as 20 p.s.i., below the pressure of fluid existing in passage 101.

Release valve 98, which is preferably in the form of a disc-shaped spring-biased check valve, is provided for permitting flow from a branch of passage 100 to a branch of passage 101 in by-pass of limiting valve 98 only when pressure in passage 100 exceeds that in passage 101 by a small degree, such as ½ p.s.i., as determined by the bias effect of a helical spring 103 acting on the side of said release valve exposed to pressure of fluid in passage 101; said release valve preventing flow therepast in the reverse direction.

Vacuum relief valve 99, which may be in the form of a disc-shaped spring-biased check valve, is provided to permit flow from a restricted passage 104, that is open to the atmosphere, to a passage 105, that is always open to passage 100; said relief valve preventing flow from passages 100 and 105 to atmosphere. The relief valve 99 thus will open if a partial vacuum tends to be developed in chamber 7 and passage 100.

The brake cylinder device 6 may be of the type disclosed in the copending application of Walter B. Kirk, U.S. Serial No. 370,050, filed July 24, 1953, now Patent No. 2,875,864, and assigned to the assignee of the present invention. This brake cylinder device 6 comprises, briefly, a differential piston assemblage 106 subject at one side to pressure of fluid in a main chamber 107 that is open to pipe 12 and at the opposite side to the combined effects of pressure of fluid in the compensating chamber 7 and pressure of a helical return spring 108 contained in an atmospheric chamber 109 that is isolated from the compensating chamber 7 by a cylindrical sleeve-like member 110 that encircles said spring and is coaxially connected to said piston assemblage. Pressure of fluid in the compensating chamber 7 thus acts over a smaller effective area of the piston assemblage 106 than that over which pressure of fluid in the main chamber 107 acts, with the result that the braking force will correspond substantially to the differential in pressures in the chambers 107 and 7 and the braking ratio will be varied according to the pressure of fluid provided in the compensating chamber 7 by the selector valve device 5.

The retarding valve device 8 comprises a piston 111 slidably mounted in a casing and carrying a coaxially arranged disc-shaped resilient valve 112, which is of smaller diameter than said piston and is suitably mounted within one face or side of said piston. Piston 111 is subject at the opposite side to pressure of a helical spring 113 which is contained in an atmospheric chamber 114 and biases said piston 111 to a cut-off position, in which it is shown, and in which the valve 112 is seated against an annular valve seat rib 115 encircling a passage 116 that is constantly connected to the brake pipe 9 either directly or preferably by way of a pipe 117 and a passageway 118 through the valve device 1.

With valve 112 seated, flow of fluid under pressure is prevented between passage 116 and a chamber 119 that is at the adjacent side (aforesaid one side) of said piston and is connected via a passage and pipe 120, a choke 121 and a passage 122 to chamber 81 of valve device 41. The area of piston 111 exposed to pressure of fluid in passage 116 when valve 112 is seated is such in relation to the total area of piston 111, and the bias effect of spring 113 is such, that if valve 112 is seated, it will not be unseated, unless and until brake pipe pressure as noted in passage 116 exceeds a preselected value, such as 50 p.s.i.; whereupon valve 112 will be promptly unseated by a snap-acting effect due to exposure of the entire area of the piston 111 to pressure of fluid in passage 116. And if valve 112 is once unseated, pressure of fluid in chamber 119 acting over the entire area of piston 111 will be sufficient to maintain valve 112 unseated against resistance of spring 113 unless and until brake pipe pressure, as noted in chamber 119, is reduced to below a predetermined lower value, such as about 9 p.s.i., to assure that pressure in chamber 81 can reduce to such value with brake pipe pressure, for reasons which will be understood from subsequent description of operation.

In order to assure that pressure in chamber 81 will be reduced to below said preselected lower value when brake pipe pressure is reduced to below said lower value, even if valve 112 should be reseated prematurely, a check valve 123 is preferably provided which is interposed between branches of passages 116 and 120 for permitting flow from passage 120 to passage 116 in by-pass of valve 112 when pressure in passage 120 exceeds that in passage 116 by a chosen degree, such as about 2 p.s.i., as determined by the bias effect of a helical spring 124, and preventing such by-passing flow in the reverse direction.

If preferred, the retarding valve device 8 (which is desirable but not essential) may be eliminated and a suitable choke (not shown) interposed between the brake pipe 9 and the chamber 81 of device 41 in series with choke 121 so that said chokes will cooperate to so restrict flow of fluid under pressure to said chamber as to defer operation of the devices 39 and 40 until after air spring pressure has attained a value necessary to maintain the car body at the aforementioned preselected height and has thereby caused the conditioning valve device 4 to assume a position corresponding to the existing condition of vehicle load.

*Operation—Fig. 1*

With the load-controlled fluid pressure brake apparatus devoid of fluid under pressure, all components thereof will be in the respective positions in which they are shown in the drawing, with the possible exception of spool valve 51, which may or may not then be locked in the position in which it is shown.

*Initial charging*

To initially charge the brake apparatus, fluid under pressure is supplied to the brake pipe 9 at the locomotive in the well-known manner for charging the brake pipe to its normal charge value.

Some of the fluid under pressure thus supplied to the brake pipe 9 will, on a particular car, flow via one branch of said brake pipe to the brake controlling valve device 1 which will thus be maintained in its release position, in which the pipe 12 is vented by being connected to a brake cylinder release pipe 125, and both the auxiliary reservoir 10 and the emergency reservoir 11 are charged with fluid under pressure from the brake pipe, in the well-known manner. Some of the fluid will also flow via another branch of the brake pipe 9 to the leveling valve device 3, for causing the latter to supply fluid under pressure via respective branches of pipe 17 to air spring 2 and also chamber 25 of conditioning valve device 4, until pressure in air spring 2 is sufficient, for the car load condition then existing, to maintain car body 13 at the aforementioned preselected height above axle housing 14 in the manner previously described. The pressure attained in the air spring 2 necessary to maintain the preselected height of the car body will be below the assumed pressure, namely 50 p.s.i., for unseating valve 112 of retarding valve device 8 so that the conditioning valve device 4 will have been properly positioned according to the existing load on the car body 13 before the load-adjusted valve device 39 shown in Fig. 1 is operated.

Some of the fluid under pressure supplied to brake pipe 9 will also flow via passage 118 of valve device 1 and pipe 117 to passage 116 of retarding valve device 8. When the pressure of fluid in passage 116 attains the aforementioned preselected value, illustratively assumed as 50 p.s.i., fluid under pressure will flow via pipe and passage 120, choke 121, and passage 122 to chamber 81 of cut-off valve device 41 and thence via cavity 87, passageway 94 and cavity 91 of spool valve 83, and passage 80 to chamber 79 of cut-off valve device 41. The pressure of fluid in chamber 79 will deflect larger diaphragm 76 and follower 86 upward until the follower contacts an inwardly extending annular flange 126 in chamber 78, to thereby so increase the loading on spring 85 as to temporarily maintain the spool valve 83 in its normal position despite the opposing pressure of fluid in chamber 81 acting on smaller diaphragm 77.

Meanwhile, fluid under pressure will also flow via cavity 91 of spool valve 83, passage 92, choke 93, volume 89 and passage 90 to chamber 74 of locking device 40; and some of the fluid under pressure supplied to passage 80 will flow to chamber 64 of said device 40. When the pressure of fluid in chamber 64 reaches a predetermined value, such as 15 p.s.i., as determined by the bias effect of spring 65, piston 63 will be pushed upward against the force of said spring for successively carrying the stem 67 and hence dog 68 out of locking engagement with the spool valve 51 and then unseating poppet valve 73 through the medium of stem 69. With valve 73 unseated, fluid under pressure will flow via chambers 74, 70, passage 71, volume 72, and passage 58 to chamber 57 of valve device 39.

Meanwhile, if air spring pressure as noted in chamber 25 is less than the aforementioned chosen value, thereby denoting that the car is lightly loaded, spool valve 23 will be maintained in its previously defined light load position, in which it is shown, by the combined pressures of springs 32 and 30, with the reult that chambers 44 and 47 of valve device 39 will be vented by way of ports 36 and 37 and ports 38 and 29. Thus, when the car is lightly loaded, piston 43 and thereby piston 42 of valve device 39 will be biased to the positions in which they are shown, permitting fluid pressure in chamber 57 to shift spool valve 51 leftward to a light load position in which it is shown.

If, on the other hand, the car is partially loaded, air spring pressure as noted in chamber 25 will exceed said chosen value but be less than a chosen higher value, and cause diaphragm 19 to deflect against resistance of spring 32 and thereby shift spool valve 23 rightward to a partial load position, in which pusher rod 33 abuts spring retainer 31 but does not effect compression of spring 30. With spool valve 23 in this position, port 37 will be vented via ports 38 and 29 but ports 35 and 36 will be interconnected by cavity 34. Hence, some of the fluid under pressure supplied past poppet valve 73 to volume 72 and chamber 57 will flow, at the rate controlled by choke 59, and via pipe 60, cavity 34, and pipe 45 to chamber 44 of valve device 39, and cause piston 42 to move and thereby operatively shift piston 43 and spool valve 51, against resistance of spring 52 and fluid pressure in chamber 57, to a partial load position defined by contact of piston 42 with an annular stop rib 127 provided on one of the casing sections and projecting radially inward into the piston bore intermediate the pistons 42, 43.

If, however, air spring pressure as noted in chamber 25 exceeds said chosen higher value, thereby denoting that the car is fully loaded, such pressure will deflect diaphragm 19, against resistance of springs 32, 30 and thereby shift spool valve 23 to a full load position, in which the pusher rod 33 abuts retainer 31 and holds spring 30 compressed, and diaphragm 19 contacts a stop surface 128 in the end wall of chamber 26. With spool valve 23 in full load position, ports 35, 36 and 37 are interconnected via cavity 34, with the result that some of the fluid under pressure supplied past poppet valve 73 to volume 72 and chamber 57 will flow, at the rate controlled by choke 59, to chambers 44 and 47. Hence, piston 43 will be moved by pressure of fluid in chamber 47 against resistance of spring 52 and thereby shift spool valve 51 rightward to a full load position.

After the position of spool valve 51 of device 39 has been adjusted according to the load-controlled position of spool valve 23 of device 4, then spool valve 51 will be locked in its adjusted position in the following manner.

When the pressure of fluid in chamber 81 of cut-off valve device 41 reaches a predetermined value, such as about 50 p.s.i., the smaller diaphragm 77 will be deflected against the resistance of spring 85 (the bias of which had previously been increased by pressure of fluid acting on the larger diaphragm 76) and thereby shift spool valve 83 to a cut-off position. With spool valve 83 in this position, cavity 95 connects passage 96 to passage 88; and passages 92 and 80 are uncovered to vent port 84 past the end of said spool valve for thereby venting chamber 57 via passages 58 and 96, cavity 95, passage 88, and passage 92 at the rate controlled by choke 93 and concurrently venting chamber 64 of device 40 and chamber 79 via branches of passage 80 at a substantially unrestricted rate. Due to this substantially unrestricted venting of chamber 64, locking piston 63 will be promptly moved by spring 65 to a locking position, in which dog 68 locks spool valve 51 in its adjusted position. If spool valve 51 is in light load position, dog 68 will extend into a recess to the right of collar 62; if said spool valve is in partial load position, dog 68 will extend into a recess intermediate collars 61, 62; and if said spool valve is in full load position, dog 68 will be disposed at the left of collar 61.

Meanwhile, upon venting of chamber 57 via the spool valve 83 in the manner just described, chamber 44 will valve be vented via cavity 34 of spool valve 23 if the latter is then in partial load position, and chambers 44 and 47 will be vented via said cavity if spool valve 23 is then in full load position; it being noted that in the other positions of spool valve 23, chambers 47 and 44, 47 will be maintained vented past the end of spool valve 23 and via vent port 29.

The positions of the various components of the selector valve device 5 will remain unchanged unless and until brake pipe pressure is reduced below approximately 10 p.s.i., in consequence of an emergency application of brakes, as will hereinafter be explained.

*Application of brakes*

When a service or an emergency rate of reduction in brake pipe pressure is effected, the brake controlling valve device 1 will operate in the usual manner to supply fluid under pressure via pipe 12 to the main pressure chamber 107 of brake cylinder device 6 and also via a branch of pipe 12 to a passage 129 leading to bore 53 of spool valve 51.

If spool valve 51 is in its light load position, in which it is shown, fluid under pressure will flow via passage 129, cavity 55, and a passage and pipe 130 to the compensating chamber 7 of brake cylinder device 6. If, however, spool valve 51 is in its partial load position then fluid under pressure will flow via passage 129, cavity 54 and passage 101 to a chamber 131 underneath limiting valve 97, and unseat the latter when the pressure of fluid exceeds the aforementioned chosen value, assumed as 20 p.s.i.; whereupon fluid under pressure will flow via passage 100, cavity 55 and passage and pipe 130 to the compensating chamber 7 for providing in the latter fluid at a pressure 20 p.s.i. less than that supplied to the pipe 12. If, on the other hand, spool valve 51 is in its full load position, cavity 55 connects passage 130 and thereby compensating chamber 7 to a vent port 132; hence, no fluid under pressure will be supplied from passage 129 to chamber 7 because fluid under pressure will merely flow via passage 129 and cavity 54 to passages 100 and 101, which are then isolated from passage 130.

It is to be noted that, in the case of an emergency application of brakes, the brake pipe will be vented. As brake pipe pressure reduces, fluid under pressure will be released from chamber 81 of cut-off valve device 41 by flow at the rate controlled by choke 121, via pipe 120 and past valve 112 (and also past valve 123 if used) and passage 118 into the brake pipe, until fluid pressure in chamber 81 has reduced to the illustrative 9 p.s.i. and caused valve 112 to be reseated (or until pressure in chamber 81 has reduced to 2 p.s.i. if the valve 123 is used). As soon as pressure in chamber 81 is reduced below about 10 p.s.i., the cut-off spool valve 83 will be shifted to its normal position, in which it is shown, by pressure of spring 85. When spool valve 83 thus moves to normal position, the spool valve 51 will be maintained locked in its adjusted position because locking device 41 will be maintained in locking position (despite the fact that chamber 81 will then be connected via cavity 87, passageway 94, cavity 91 and passage 80 to chamber 64 of said locking device) because pressure in chamber 81 and hence in chamber 64 will then be below the aforementioned 15 p.s.i. necessary to cause unlocking of the dog 68 from spool valve 51. Thus, the various components of the selector valve device 5 (except possibly for the spool valve 51) will be positioned in the same positions as they assumed prior to initial charging; and upon recharging of the brake pipe to release the emergency application of brakes, in the manner hereinafter described, the spool valve 51 will be unlocked, repositioned and relocked according to the then existing load on the car, in the same manner as described during initial charging.

*Release of brakes*

To release brakes, brake pipe pressure is increased at the locomotive for thereby causing brake controlling valve device 1 to operate to release fluid under pressure from pipe 12 and hence from main brake cylinder chamber 107 via release pipe 125 and also recharge the auxiliary reservoir 10 and emergency reservoir 11 from the brake pipe.

If spool valve 51 is locked in its light load position, fluid under pressure will be released from compensating chamber 7 via pipe and passage 130, cavity 55, passage 129, and pipe 12.

If, however, the spool valve 51 is locked in its partial load position, fluid under pressure will flow from compensating chamber 7 via pipe and passage 130 and cavity 55 to passage 100, whence it will flow (in by-pass of limiting valve 97) past release valve 98 into passage 101 and thence via cavity 54, passage 129 and pipe 12 to the atmosphere. If a partial vacuum should tend to be created in compensating chamber 7 during return movement of the brake cylinder piston assemblage 106 under action of spring 108, such vacuum will be destroyed by the relief valve 99, which will admit atmospheric air to passage 105 and 100, and thereby prevent the piston assemblage from being stalled short of its release position, in which it is shown.

If spool valve 51 is locked in its full load position, no fluid under pressure will have been supplied to the compensating chamber 7 because said chamber will always be open to the atmosphere via passage 129, cavity 55, and port 131.

*Description and operation—Fig. 2*

The load-controlled fluid pressure brake apparatus constructed according to this embodiment of the invention differs from that shown in Fig. 1 in that it comprises, in lieu of the valve devices 4 and 5, a two-position conditioning valve device 200 operative to a light load position or to a full load position according to whether air spring pressure is less than or exceeds a chosen value, for thereby conditioning a two-position selector valve device 201 to connect the brake cylinder compensating chamber 7 selectively to pipe 12 or the atmosphere, respectively, to thereby provide two different braking ratios according to car load as measured by air spring pressure.

Where appropriate, components of the brake apparatus shown in Fig. 2 which may be similar to those shown in Fig. 1 have been designated by the same reference numerals.

Conditioning valve device 200 comprises a resilient diaphragm 202 that is suitably clamped about its outer edge between sections of a casing 203 and is operatively connected through the medium of a diaphragm follower 204 and a follower stem 205 to a coaxially arranged spool valve 206 having slidable, sealing contact with the wall of an aligned bore 207 in the casing. At the side of diaphragm 202 farthest from the spool valve 206 is a chamber 208 that is constantly connected to the air spring 2 via pipe 17, and at the opposite side of said diaphragm is a chamber 209 open to the atmosphere via a port 210.

A helical bias spring 211 disposed in an atmospheric chamber 212 at the inner end of bore 207 bears on the inner end of spool valve 206 for biasing said spool valve to the aforementioned light load position, defined by contact of diaphragm 202 with a suitable stop formed in the end wall of chamber 208 and in which position it is shown, when air spring pressure as noted in chamber 208 is less than said chosen value.

The selector valve device 201 comprises a load adjusted valve device 213, a locking device 214, and a cut-off valve device 215 that controls operation of the devices 213 and 214.

The load-adjusted valve device 213 comprises two spaced coaxially arranged pistons 216 and 217 of different areas slidably mounted in a casing and cooperatively connected by a coaxially arranged stem 218 having spaced shoulders 219, 220 between which shoulders is retained a slide valve 221 that is contained in an atmospheric chamber 222 and is slidable on a valve seat 223 formed in the side wall of said chamber. At the outer face of larger piston 216 is a chamber 224 and at the outer face of smaller piston 217 is a chamber 225.

The locking device 214 comprises a piston valve 226 subject opposingly to pressure of fluid in a chamber 227 and to pressure of a helical bias spring 228 in chamber 222. Piston valve 226 has a coaxially arranged, suitably guided piston stem 229 that extends through chamber 222 and at its outer end is operatively connected (through a pin and slot connection) to one arm 230 of a bell crank 231 that is rockably supported at its knee on a bracket 232 preferably formed integrally with the casing. The other arm 233 of bell crank 231 is pivotally connected to one end of a suitably guided cylindrical locking member 234 that has at its other end a dog 235 adapted to lock the stem 218 and thereby the pistons 216, 217 and slide valve 221 against axial movement.

The cut-off valve device 215 comprises a movable abutment 236 having a coaxially arranged stem 237 having axially spaced shoulders for retaining a slide valve 238 that is contained in a chamber 239 and rides on a seat 240 formed in the side wall of said chamber. The movable abutment is subject opposingly to pressure of fluid in chamber 239 and to the force of a helical bias spring 241 in an atmospheric chamber 242, said spring acting through the medium of a spring plate 243 to bias the movable abutment 236 and thereby the slide valve to a normal position, in which it is shown, and which position is defined by contact of the movable abutment with a stop shoulder in chamber 239.

In operation, when the load-controlled fluid pressure brake apparatus is devoid of fluid under pressure, all components thereof will be in the respective positions in which they are shown in the drawing, with the possible exception of load-adjusted valve device 213, as will be explained later.

When the brake apparatus is initially charged or is recharged following an emergency application, fluid under pressure will flow from brake pipe 9, via brake controlling valve device 1 in release position, retarding valve device 8, pipe 120, a choke 244, and a passage 245 to chamber 239 of cut-off valve device 215, whence it will flow around the slide valve 238 and via a passage 246 to chamber 227 underneath piston valve 226. When the pressure in chamber 227 reaches a predetermined value, such as 20 p.s.i., piston valve 226 will be shifted against resistance of spring 228 to an unlocking position, defined by contact of piston valve 226 with a shoulder in the casing. During this movement of piston valve 226, stem 229 will be shifted upward and pivot bell crank 231 counterclockwise for disengaging locking member 234 from stem 218, and then said piston valve will uncover chamber 227 to a passage 247 leading to chamber 225 of load-adjusted valve device 213.

Meanwhile, if air spring pressure as noted in chamber 208 of conditioning valve device 200 is below the aforementioned chosen value, spool valve 206 will be biased to its light load position, in which a cavity 248 connects a pipe 249 open to passage 246 with a pipe and passage 250 leading to chamber 224 of the load-adjusted valve device 213. Thus, if spool valve 206 is in light load position, the pressure of fluid in chambers 225 and 224 will be equal, with the result that such pressure will be effective on the larger piston 216 of the differential piston assemblage 216, 217 to maintain slide valve 221 in a light load position in which it is shown, and in which a cavity 251 in said slide valve connects a passage 252 leading to a branch of pipe 12 with a passage and pipe 253 leading to compensating chamber 7.

If however, the pressure of fluid as noted in chamber 208 of device 200 exceeds the aforementioned chosen value, diaphragm 202 will be deflected against the force of spring 211 for shifting the spool valve 206 to a full load position, defined by contact of the diaphragm follower 204 with a shoulder 254 in the casing, and in which position pipes 249 and 250 are disconnected and pipe 250 is opened past the inner end of said spool valve to atmosphere via vent port 210 for thereby venting chamber 224. Under this condition, pressure fluid supplied to chamber 225 will be effective on the smaller piston 217 to move the differential piston assemblage 216, 217 upward for shifting the slide valve 221 to a full load position, in which passage 253 will be uncovered past the lower end of said slide valve to atmospheric chamber 222, for thereby maintaining the compensating chamber 7 vented.

As in the apparatus of Fig. 1 so in the case of the apparatus of Fig. 2, the pressure attained in the air spring 2 necessary to maintain the preselected height of the car body for light load or full load will be less than the assumed pressure, namely 50 p.s.i., for unseating valve 112 of the retarding valve device 8, with the result that conditioning valve device 200 will be properly positioned according to the existing load on the car body before the load-adjusted valve device 213 is operated.

When the pressure of fluid in chamber 239 of cut-off valve device 215 exceeds a preselected value, such as 30 p.s.i., movable abutment 236 will be moved against the force of helical spring 241 and shift the slide valve 238 to a cut-off position, defined by contact of plate 243 with a shoulder in chamber 242. With slide valve 238 in this position, a passageway 255 therein connects passage 246 to a passage 256 that is open to the atmospheric chamber 222 for thereby releasing fluid under pressure from chamber 225 past piston valve 226 and also releasing fluid under pressure from chamber 224 via the conditioning spool valve 206 if it is then in light load position. When pressure in chamber 227 is reduced below the illustrative 20 p.s.i., piston valve 226 will be moved by spring 228 to a locking position, in which it is shown, and which position is defined by contact of valve 226 with the end wall of chamber 227. During this movement of piston valve 226, bell crank lever 231 will be rocked clockwise through the medium of stem 229 and thereby advance the dog 235 toward stem 218. If slide valve 221 is in its light load position, dog 235 will overlie the upper face of a positioning lug 257 formed on stem 218; whereas, if the slide valve 221 is in full load position, dog 235 will overlie the lower face of said lug, for thereby locking the stem and thereby the pistons 216, 217 and said slide valve in the appropriate position.

When a service or emergency reduction in brake pipe pressure is thereafter effected, the brake controlling valve device 1 will operate in the usual manner to supply fluid under pressure via pipe 12 to the main pressure chamber 107 of brake cylinder device 6. If slide valve 221 of shown in the drawing, fluid under pressure will also flow via a branch of pipe 12 and previously described communication to the compensating chamber 7 of device 6, thereby producing a limited braking force as previously explained. Some of the fluid under pressure supplied to passage 252 will flow to a chamber 258 where it will act on a diaphragm 259 for assisting a bias spring 260 in said chamber in operatively holding slide valve 221 against seat 223 through the medium of a loading strut 261 rockably interposed between the diaphragm 259 and slide valve 221. During release of the brake application, fluid under pressure will be released from chamber 7 and chamber 258 by reverse flow through the communications just described.

If, however, slide valve 221 is locked in its full load position, the main chamber 107 will be disconnected from the compensating chamber 7 and the latter will be maintained vented for causing a maximum braking force to be developed.

If an emergency application of brakes is effected and the brake pipe is consequently vented, fluid under pressure will be released via retarding valve device 8, in the manner described in connection with Fig. 1, from chamber 239 of cut-off valve device 215, with the result that the cut-off slide valve 238 will be shifted to normal position, in which it is shown, for uncovering passage 246 to chamber 239. Since pressure of fluid in passage 246 and hence in chamber 227 of locking device 214 will then be below the illustrative 20 p.s.i. necessary to effect unlocking of dog 235, the slide valve 221 will be maintained locked in position. However, upon recharging of the brake pipe to release the emergency application, the devices 8, 213, 214 and 215 will be operated in the manner described in connection with initial charging to again successively unlock slide valve 221, then reposition it according to the then existing load condition, and then relock said slide valve in position and also vent passage 246 for thereby venting chamber 225 or chambers 224 and 225, according to whether the conditioning slide valve 206 is then in its full load position or its light load position.

Having now described the invention, what I claim as new and desire to secure by Letters Patent is:

1. A load-controlled brake apparatus for a vehicle having a sprung portion and an unsprung portion, said apparatus comprising, in combination, a brake pipe, air spring means resiliently supporting the sprung portion in vertically spaced relation to the unsprung portion, leveling valve means operably connected to said portions for so controlling the pressure of fluid in said air spring means as to cause the latter to support the sprung portion at a preselected height relative to the unsprung portion irrespective of vehicle load, a brake cylinder comprising differential piston means subject to fluid pressure in a main chamber opposing fluid pressure in a compensating chamber that acts over a smaller effective area of said differential piston means than that on which the pressure in the main chamber acts for providing one braking ratio or a greater braking ratio according as both of said chambers are charged or only the main chamber is charged with fluid under pressure, brake controlling means responsive to a reduction in brake pipe pressure to supply fluid under pressure to said main chamber and responsive to a subsequent increase in brake pipe pressure to release fluid under pressure from said main chamber, load-adjusted valve means operative so long as it is in a light load position to connect said compensating chamber to said main chamber and operative so long as it is in a full load position to cut off said main chamber from said compensating chamber and connect the latter to atmosphere, and conditioning valve means controlled by air spring pressure opposing a constant bias pressure for causing operation of said load-adjusted valve means to its light load position or heavy load position according to whether air spring pressure is less than or exceeds said constant bias pressure.

2. A load-controlled brake apparatus for a vehicle having a sprung portion and an unsprung portion, said apparatus comprising, in combination, a brake pipe, air spring means resiliently supporting the sprung portion in vertically spaced relation to the unsprung portion, leveling valve means operably connected to said portions for so controlling the pressure of fluid in said air spring means as to cause the latter to support the sprung portion at a preselected height relative to the unsprung portion irrespective of vehicle load, a brake cylinder comprising a first differential piston means subject to fluid pressure in a main chamber opposing fluid pressure in a compensating chamber that acts over a smaller effective area of said first differential piston means than that on which the pressure in the main chamber acts for providing one braking ratio or a greater braking ratio according as both of said chambers are charged or only the main chamber is charged with fluid under pressure, brake controlling means responsive to a reduction in brake pipe pressure to supply fluid under pressure to said main chamber and responsive to a subsequent increase in brake pipe pressure to release fluid under pressure from said main chamber, other valve means having a light load position in which it connects said compensating chamber to said main chamber and having a full load position in which it cuts off said main chamber from said compensating chamber and connects the latter to atmosphere second differential piston means for controlling positioning of said other valve means, and conditioning valve means controlled by pressure of fluid in said air spring means and operative to so control the pressures of fluid acting on said second differential piston means as to cause the latter to shift said other valve means to its said light load position or said full load position according to whether pressure of fluid in said air spring means is less than or exceeds a chosen value.

3. A load-controlled brake apparatus for a vehicle having a sprung portion and an unsprung portion, said apparatus comprising, in combination, a brake pipe, air spring means resiliently supporting the sprung portion in vertically spaced relation to the unsprung portion, leveling valve means operably connected to said portions and operative to supply to said air spring means from said brake pipe fluid at such pressure as may be necessary to cause said air spring means to support said sprung portion at a preselected height relative to the unsprung portion irrespective of vehicle load, a brake cylinder comprising a first differential piston means subject to fluid pressure in a main chamber opposing fluid pressure in a compensating chamber that acts over a small effective area of said first differential piston means than that on which the pressure in the main chamber acts for providing one braking ratio or a greater braking ratio according as both of said chambers are charged or only the main chamber is charged with fluid under pressure, brake controlling means responsive to a reduction in brake pipe pressure to supply fluid under pressure to said main chamber and responsive to a subsequent increase in brake pipe pressure to release fluid under pressure from said main chamber, other valve means having a light load position in which it connects said compensating chamber to said main chamber and having a full load position in which it cuts off said main chamber from said compensating chamber and connects the latter to atmosphere, second differential piston means comprising a small piston subject to fluid pressure in a first chamber chargable from the brake pipe and a large piston subject to fluid pressure in a second chamber, said second differential piston means being operative to shift said other valve means to its said light load position or its said full load position according to whether while said first chamber is charged from the brake pipe said second chamber is charged with fluid under pressure from the brake pipe or is vented, and conditioning valve means controlled by pressure of fluid in said air spring means and operative to cause said second chamber to be charged with fluid under pressure from the brake pipe or vented according to whether fluid pressure in said air spring means is less than or exceeds a chosen value, and retarding valve means for deferring supply of fluid under pressure from said brake pipe to said first chamber until after said air spring means is charged to a pressure sufficient to maintain said sprung portion at said preselected height.

4. A load-controlled brake apparatus as defined in claim 3, including check valve means for permitting substantially complete release of fluid under pressure from said first chamber into said brake pipe in by-pass of said retarding valve means upon a reduction in brake pipe pressure.

5. A load-controlled brake apparatus for a vehicle having a sprung portion and an unsprung portion, said apparatus comprising, in combination, a brake pipe, air spring means resiliently supporting the sprung portion in vertically spaced relation to the unsprung portion, leveling valve means operably connected to said portions for so controlling the pressure of fluid in said air spring means as to cause the latter to support the sprung portion at a preselected height relative to the unsprung portion irrespective of vehicle load, a brake cylinder comprising differential piston means subject to fluid pressure in a main chamber opposing fluid pressure in a compensating chamber that acts over a smaller effective area of said differential piston means than that on which the pressure in the main chamber acts for providing one braking ratio or a greater braking ratio according as both of said chambers are charged or only the main chamber is charged with fluid under pressure, brake controlling means responsive to a reduction in brake pipe pressure to supply fluid under pressure to said main chamber and responsive to a subsequent increase in brake pipe pressure to release fluid under pressure from said main chamber, load-adjusted valve means operative so long as it is in a light load position to connect said compensating chamber to said main chamber and operative so long as it is in a full load position to cut off said main chamber from said compensating chamber and connect the latter to atmosphere, conditioning valve means controlled by air spring pressure opposing a constant bias pressure for causing operation of said load-adjusted valve means to its light load position or heavy load position according to whether air spring pressure is less than or exceeds said constant bias pressure, locking means controlled by pressure of fluid in a control chamber opposing a spring bias and operative to lock said load-adjusted valve means against movement or permit movement of said load-adjusted valve means according as pressure in said control chamber is below or above a predetermined value, and cut-off valve means operative to connect said control chamber to said brake pipe or to atmosphere according as brake pipe pressure is less than or exceeds a predetermined higher value.

6. A load-controlled brake apparatus for a vehicle having a sprung portion and an unsprung portion, said apparatus comprising, in combination, a brake pipe, air spring means resiliently supporting the sprung portion in vertically spaced relation to the unsprung portion, leveling valve means operably connected to said portions for so controlling the pressure of fluid in said air spring means as to cause the latter to support the sprung portion at a preselected height relative to the unsprung portion irrespective of vehicle load, a brake cylinder comprising differential piston means subject to fluid pressure in a main chamber opposing fluid pressure in a load compensating chamber that acts over a smaller effective area of said differential piston means than that on which the pressure in the main chamber acts for providing one braking ratio or a greater braking ratio according as both of said chambers are charged or only the main chamber is charged with fluid under pressure, brake controlling means responsive to a reduction in brake pipe pressure to supply fluid under pressure to said main chamber and responsive to a subsequent increase in brake pipe pressure to release fluid under pressure from said main chamber, load-adjusted valve means of the differential piston type subject to fluid pressure in one chamber chargeable with fluid under pressure during charging of the brake pipe and an opposing fluid pressure in a second chamber acting over a larger effective area than pressure in said one chamber acts, said load-adjusted valve means being operative to when said one chamber and said second chamber are concurrently charged with fluid under pressure and operative to connect said compensating chamber to atmosphere when only said one chamber is charged with fluid under pressure, and conditioning valve means controlled by pressure of fluid in said air spring means for opening said second chamber to said one chamber when air spring pressure is less than a chosen value and for opening said second chamber to atmosphere when air spring pressure exceeds said chosen value connect said compenusating chamber to said main chamber.

7. A load-controlled brake apparatus for a vehicle having a sprung portion and an unsprung portion, said apparatus comprising, in combination, a brake pipe, air spring means resiliently supporting the sprung portion in vertically spaced relation to the unsprung portion, leveling valve means operably connected to said portion for so controlling the pressure of fluid in said air spring means as to cause the latter to support the sprung portion at a preselected height relative to the unsprung portion irrespective of vehicle load, a brake cylinder comprising differential piston means subject to fluid pressure in a main chamber opposing fluid pressure in a load compensating chamber that acts over a smaller effective area of said differential piston means than that on which the pressure in the main chamber acts for providing one braking ratio or a greater braking ratio according as both of said chambers are charged or only the main chamber is charged with fluid under pressure, brake controlling means responsive to a reduction in brake pipe pressure to supply fluid under pressure to said main chamber and responsive to a subsequent increase in brake pipe pressure to release fluid under pressure from said main chamber, load-adjusted valve means having a light load position in which said main chamber is directly connected to said compensating chamber, a partial load position in which fluid is supplied from said main chamber to said compensating chamber at a pressure which is a chosen degree less than the pressure of a fluid supplied to said main chamber, and a full load position in which said compensating chamber is disconnected from said main chamber and connected to atmosphere, a first movable abutment operable by fluid under pressure to move said valve means to said light load position, a second movable abutment operable by fluid under pressure to move said valve means to said partial load position against pressure of fluid acting on said first movable abutment, a third movable abutment operable by fluid under pressure to move said valve means to said full load position against pressure of fluid acting on said first movable abutment, the effective area of said first movable abutment being smaller than that of the second and third movable abutments, and said second movable abutment having more limited travel than said third movable abutment against pressure of fluid acting on said first movable abutment for defining said partial load position, and conditioning valve means controlled by air spring pressure and operative selectively to vent fluid under pressure from said second and third movable abutments, or to supply fluid to said second movable abutment at the pressure of fluid acting on said first movable abutment or to supply fluid to said third movable abutment at the pressure of fluid acting on said first movable abutment according as air spring pressure is less than a chosen value, or is intermediate said chosen value and a chosen higher value, or exceeds said chosen higher value, respectively, said first movable abutment being supplied with fluid under pressure in by-pass of said conditioning valve means.

8. A load-controlled brake apparatus for a vehicle having a sprung portion and an unsprung portion, said apparatus comprising, in combination, a brake pipe, air spring means resiliently supporting the sprung portion in vertically spaced relation to the unsprung portion, leveling valve means operably connected to said portions for so controlling the pressure of fluid in said air spring means as to cause the latter to support the sprung portion at a preselected height relative to the unsprung portion irrespective of vehicle load, a brake cylinder comprising differential piston means subject to fluid pressure in a main chamber opposing fluid pressure in a load compensating chamber that acts over a smaller effective area of said differential piston means than that on which the pressure in the main chamber acts for providing one braking ratio or a greater braking ratio according as both of said chambers are charged or only the main chamber is charged with fluid under pressure, brake controlling means responsive to a reduction in brake pipe pressure to supply fluid under pressure to said main chamber and responsive to a subsequent increase in brake pipe pressure to release fluid under pressure from said main chamber, load-adjusted valve means of the differential piston type subject to fluid pressure in one chamber chargeable with fluid under pressure from the brake pipe during charging of the latter and an opposing fluid pressure in a second chamber acting over a larger effective area than pressure in said one chamber acts, said load-adjusted valve means being operative to selectively connect said compensating chamber to said main chamber when only said one chamber is charged with fluid under pressure and operative to connect said compensating chamber to atmosphere when said one chamber and said second chamber are concurrently charged with fluid under pressure, and conditioning valve means controlled by pressure of fluid in said air spring means for opening said second chamber to said one chamber when air spring pressure exceeds a chosen value and for opening said second chamber to atmosphere when said air spring pressure is less than said chosen value.

9. A load-controlled brake apparatus for a vehicle having a sprung portion and an unsprung portion, said apparatus comprising, in combination, a brake pipe, air spring means resiliently supporting the sprung portion in vertically spaced relation to the unsprung portion, leveling valve means operably connected to said portions for so controlling the pressure of fluid in said air spring means as to cause the latter to support the sprung portion at a preselected height relative to the unsprung portion irrespective of vehicle load, a brake cylinder comprising differential piston means subject to fluid pressure in a main chamber opposing fluid pressure in a load compensating chamber that acts over a smaller effective area of said differential piston means than that on which the pressure in the main chamber acts for providing one braking ratio or a greater braking ratio according as both of said chambers are charged or only the main chamber is charged with fluid under pressure, brake controlling means responsive to a reduction in brake pipe pressure to supply fluid under pressure to said main chamber and responsive to a subsequent increase in brake pipe pressure to release fluid under pressure from said main chamber, three coaxially arranged movable abutments, the first of which is subject to fluid pressure in a first chamber, the second of which is subject to fluid pressure in a second chamber, and the third of which is subject to fluid pressure in a third chamber, the effective area of said first movable abutment being smaller than that of said second and third movable abutments, and pressure in said first chamber opposing pressure of fluid in said second and third chambers, means for limiting the travel of said second movable abutment against pressure in said first chamber, limiting valve means for limiting the pressure of fluid supplied to the compensating chamber to a chosen degree less than the pressure of fluid supplied to the main chamber, release valve means for permitting substantially complete release of fluid under pressure from said compensating chamber in by-pass of said limiting valve means, load-adjusted valve means controlled by said movable abutments and operative to connect said compensating chamber directly to said main chamber, or to said main chamber via said limiting valve means and release valve means, or to atmosphere according to whether only said first chamber, or both said first and second chambers, or said first and third chambers are charged with fluid under pressure, and conditioning valve means controlled by air spring pressure and operative to connect said second and third chambers to atmosphere, or to connect said second chamber to said first chamber, or to connect said third chamber to said first chamber according as air spring pressure is less than a chosen value, intermediate said chosen value and a chosen higher value, or exceeds said chosen higher value, respectively, said first chamber being charged with fluid under pressure supplied from the brake pipe in by-pass of said conditioning valve means.

References Cited in the file of this patent
UNITED STATES PATENTS

| | | |
|---|---|---|
| 2,150,576 | Bell | Mar. 14, 1939 |
| 2,690,932 | Thomas | Oct. 5, 1954 |
| 2,699,972 | Sexton et al. | Jan. 18, 1955 |
| 2,720,429 | Newell | Oct. 11, 1955 |
| 2,830,849 | Erson et al. | Apr. 15, 1958 |
| 2,858,166 | Thomas | Oct. 28, 1958 |